No. 776,350. PATENTED NOV. 29, 1904.
W. L. RING & P. L. COOPER.
VEHICLE WHEEL.
APPLICATION FILED MAR. 22, 1904.
NO MODEL.
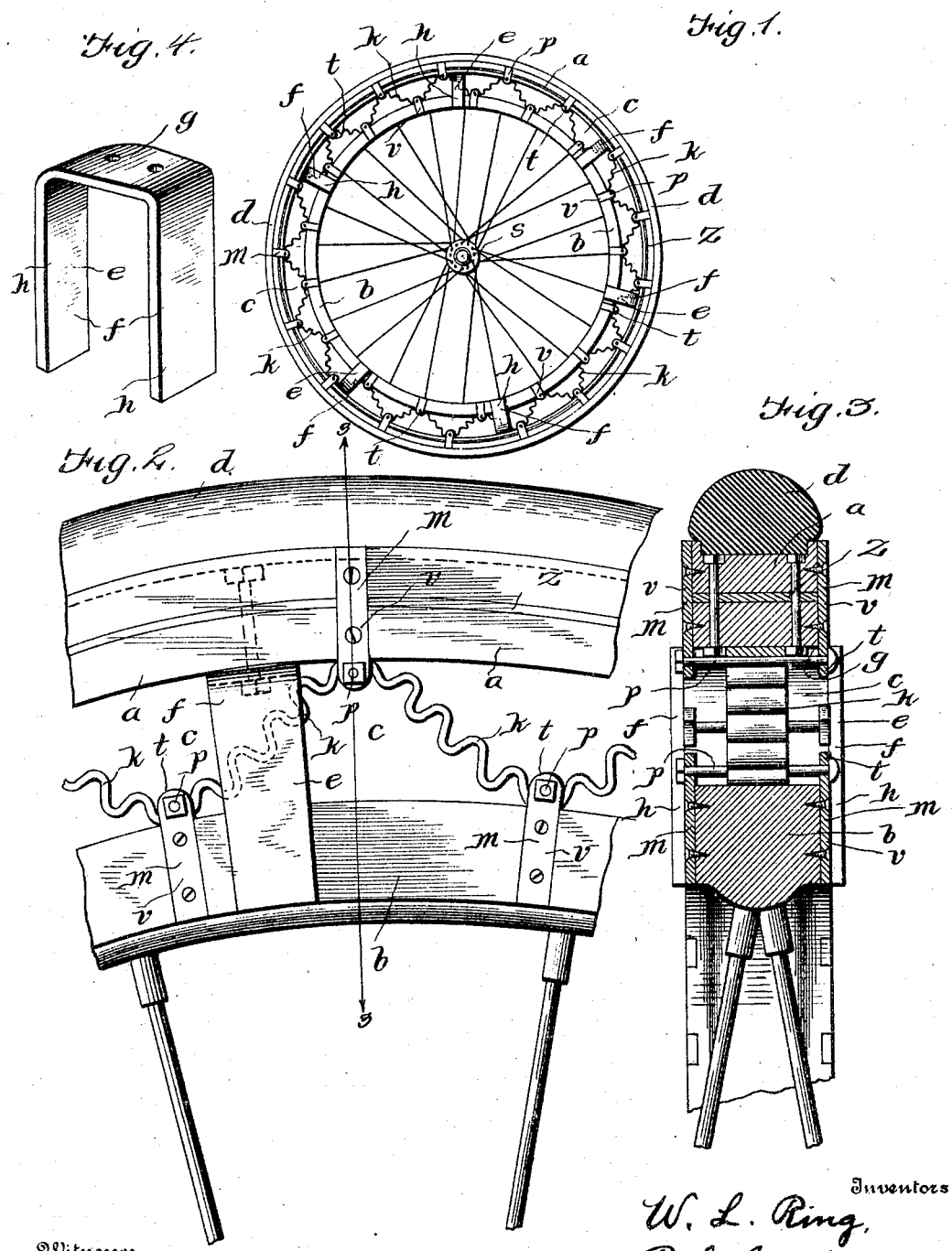

No. 776,350.

Patented November 29, 1904.

UNITED STATES PATENT OFFICE.

WILLIAM L. RING AND PERRY L. COOPER, OF SAGINAW, MICHIGAN.

VEHICLE-WHEEL.

SPECIFICATION forming part of Letters Patent No. 776,350, dated November 29, 1904.

Application filed March 22, 1904. Serial No. 199,484. (No model.)

*To all whom it may concern:*

Be it known that we, WILLIAM L. RING and PERRY L. COOPER, citizens of the United States, and residents of Saginaw, in the county of Saginaw and State of Michigan, have made a certain new and useful Invention in Vehicle-Wheels; and we declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of our wheel. Fig. 2 is a fragmentary view of the rim portion of the wheel in side view. Fig. 3 is a section on the line 3 3, Fig. 2. Fig. 4 is a detail view of one of the guide-clips *e*.

The invention relates to vehicle-wheels; and it consists in the novel construction and combination of parts, as hereinafter set forth.

In the accompanying drawings, illustrating the invention, the letter *a* designates an outer felly-rim, and *b* an inner felly-rim parallel to said outer felly-rim and separated therefrom by an interspace *c*, which extends entirely around the wheel between the rims *a* and *b*. The outer rim *a* is provided with a tire, usually of solid rubber, (indicated at *d*.) Guide-clips *e*, consisting of double branched metallic pieces, are secured by their transverse middle portions *g* to the outer rim *a* and have their branches *h* extending inward beyond the inner rim in such a manner, however, as to engage the sides of the latter and prevent undue lateral movement. At the same time free movement toward or from the outer rim is provided for. Such free movement is, however, controlled by the springs *k*, which are located in the interspace *c* between the outer and inner rims. These springs are arranged in series entirely around the wheel in said interspace and are secured to the outer and inner rims by means of fastenings *m*, which prevent any sliding motion and yet allow the elasticity of the springs full play. The outer rim *a* is made in two superposed sections, and a thin piece of steel *z* of hooped form is placed between the sections, which are fastened together by radial bolts. This device is intended to prevent the wheel from becoming elliptical.

The springs employed are usually corrugated steel strips which are fastened to the outer and inner rims in such a manner as to extend obliquely from one to the other, as shown in the drawings. As these springs have not sufficient lateral strength to keep the outer and inner rims in position under a side strain—as, for instance, when the wheel is inclined from the vertical—the brace-clips *e* are provided and serve to keep the outer and inner rims in the same plane.

The inner rim *b* is designed to be connected with the hub *s* by means of spokes, usually of wire, in the ordinary way.

The fastenings *m*, whereby the springs are secured to the rims, consist of ears *v*, which are set flush in opposite sides of the rim, and transverse bolts *p*, which pass through holes in extensions *t* inward from the outer rim and outward from the inner rim. The transverse bolts *p* lie in the corrugations of the springs *k*. The serpentine form of the springs *k* allows the necessary play in movement of the rim-sections *a* and *b* with relation to each other.

What we claim as our invention, and desire to secure by Letters Patent, is—

1. A vehicle-wheel having an inner felly-rim connected to the hub, an outer sectional felly-rim having an intermediate steel hoop for supporting the wheel in circular form, the guiding and bracing clips, and the oblique corrugated springs extending around the wheel between the inner and outer felly-rims, and fastened to said inner and outer rims, substantially as specified.

2. In a vehicle-wheel, the combination with the outer sectional felly-rim, and the intermediate steel hoop, bolted between the sections of said rim, of the inner felly-rim the lateral guide-clips, and the series of oblique corrugated springs, fastened both to the outer rim, and to the inner rim, substantially as specified.

3. A vehicle-wheel having a double rim, the sections of which are separated by an interspace, the oblique corrugated springs extending around the wheel in said interspace, and transverse fastening-bolts lying in the corrugations of said springs and connecting the same to the inner and outer rim-sections, substantially as specified.

In testimony whereof we affix our signatures in presence of two witnesses.

WILLIAM L. RING.
PERRY L. COOPER.

Witnesses:
P. W. STAFFELD,
CATHERINE STAFFELD.